United States Patent [19]

Eckberg et al.

[11] Patent Number: 5,710,681
[45] Date of Patent: Jan. 20, 1998

[54] PIVOT BEARING HAVING NO MOVING PARTS FOR USE IN A HIGH DENSITY DATA TAPE DRIVE

[75] Inventors: Eric Alan Eckberg; Gerald Daniel Malagrino, Jr., both of Rochester; Brian Lee Rappel, Grand Meadow, all of Minn.

[73] Assignee: International Business Machines Corporation, Armonk, N.Y.

[21] Appl. No.: 586,505

[22] Filed: Jan. 16, 1996

Related U.S. Application Data

[63] Continuation-in-part of Ser. No. 489,462, Jun. 7, 1995, and a continuation-in-part of Ser. No. 474,227, Jun. 7, 1995, and a continuation-in-part of Ser. No. 472,829, Jun. 7, 1995, Pat. No. 5,677,806.

[51] Int. Cl.$^6$ .......................... G11B 5/584; G11B 5/55; G11B 21/02
[52] U.S. Cl. .......................... 360/106; 360/78.02; 360/109
[58] Field of Search .......................... 360/106, 109, 360/77.12, 78.02

[56] References Cited

U.S. PATENT DOCUMENTS

| | | | |
|---|---|---|---|
| 4,215,377 | 7/1980 | Norris | 360/73 |
| 4,363,046 | 12/1982 | Saito | 360/106 |
| 4,627,039 | 12/1986 | Meyer | 369/44 |
| 4,646,183 | 2/1987 | Cohen | 360/106 |
| 4,769,732 | 9/1988 | Tanaka | 360/132 |
| 4,858,047 | 8/1989 | Cannon et al. | 360/106 |
| 4,864,448 | 9/1989 | Karibe et al. | 360/132 |
| 4,943,877 | 7/1990 | Cannon et al. | 360/106 |
| 5,016,123 | 5/1991 | Karsh | 360/69 |
| 5,040,082 | 8/1991 | Moro et al. | 360/27 |
| 5,047,883 | 9/1991 | Aldrich et al. | 360/109 |
| 5,091,808 | 2/1992 | Nigam | 360/78.05 |
| 5,191,492 | 3/1993 | Nayak et al. | 360/78.02 |
| 5,239,437 | 8/1993 | Hoge et al. | 360/132 |
| 5,253,136 | 10/1993 | Suzuki et al. | 360/132 |
| 5,268,802 | 12/1993 | Bar | 360/77.13 |
| 5,270,886 | 12/1993 | Nigam | 360/78.05 |
| 5,277,503 | 1/1994 | Nagao | 400/208 |
| 5,280,402 | 1/1994 | Anderson et al. | 360/106 |
| 5,325,243 | 6/1994 | Rath et al. | 360/71 |
| 5,327,305 | 7/1994 | Thomas | 360/74.5 |
| 5,331,490 | 7/1994 | Richards et al. | 360/109 |
| 5,379,170 | 1/1995 | Schwarz | 360/109 |

*Primary Examiner*—Stuart S. Levy
*Assistant Examiner*—William J. Klimowicz
*Attorney, Agent, or Firm*—Laurence R. Letson

[57] ABSTRACT

A pivot bearing structure formed of a leaf spring is incorporated into a rocker or force transmission member which whenever mounted to a carriage of a high density data tape drive system precisely defines the pivot axis of the rocker and provides a very high degree of stiffness in a vertical plane, that plane being parallel to the recording surface of the magnetic tape. The rocker derives motion from a voice coil motor (VCM) and transmits that controlled motion to a magnetic head which is suspended for movement in a vertical plane while in contact with a length of magnetic tape upon which data is recorded or from which data is read. The movement of the magnetic head may be very precisely controlled by energizing the VCM, because the pivot axis is extremely well defined due to the stiffness in the vertical plane of the pivot bearing. Movement of the VCM coil directly translates into movement of the magnetic head. The rocker is fabricated to form a cavity or pocket exposing a portion of the leaf spring to permit the bonding of another part to the leaf spring.

9 Claims, 3 Drawing Sheets

PIVOT BEARING HAVING NO MOVING PARTS FOR USE IN A HIGH DENSITY DATA TAPE DRIVE

RELATED APPLICATIONS

This application is a continuation-in-part of: co-pending U.S. patent application Ser. No. 08/489,462 filed Jun. 7, 1995, by Eric A. Eckberg, Gerald D. Malagrino, Jr., and Brian L. Rappel; co-pending U.S. patent application Ser. No. 08/474,227 filed Jun. 7, 1995, by Eric A. Eckberg, Gerald D. Malagrino, Jr., and Brian L. Rappel; and U.S. patent application Ser. No. 08/472,819, now U.S. Pat. No. 5,677,806, filed Jun. 7, 1995, by Eric A. Eckberg, Gerald D. Malagrino, Jr., Brian L. Rappei, and Thomas D. Weller; all of which are incorporated hereinto by reference for purposes of disclosure.

FIELD OF THE INVENTION

This invention relates to precision force transmission members and more specifically to magnetic tape recorder head positioning drives having a force transmission member in order to position a magnetic head relative to a carriage of the tape recorder system.

BACKGROUND OF THE INVENTION

In positioning the magnetic head relative to a carriage of a tape recorder for recording data on a magnetic tape, the need for precision is dictated to a very large extent by the track density of the recorded data. The data track recording density as well as the diminutive size of the tape, cartridge and recorder, all contribute to a requirement for a simple, reliable, low-inertia, inexpensive and highly precise apparatus for positioning the recording head of the magnetic tape read/write device.

The space available for a component and particularly for a force transmission member used to transmit drive forces from a voice coil motor to a suspended, movable magnetic head is highly restricted within the tape recorder and does not permit use of devices with conventional bearings.

Conventional bearings, such as roller bearings, not only are consumers of scarce space but also are expensive. The use of conventional bearings, even precision roller bearings, adversely affects the positioning of the magnetic head with respect to the magnetic tape.

Needing to simplify the structure of the device as well as to simplify the assembly thereof, the transmission member should be readily assembled along with the remainder of the carriage of the tape drive and then, preferably, not require any servicing or adjustments once assembled.

OBJECTS OF THE INVENTION

It is an object of the invention to provide a support having a high degree of stiffness in a vertical plane for a force transmission member within a tape drive mechanism.

It is another object of the invention to provide a force transmission member suspension which requires very little torque to pivotally displace the force transmission member through its range of motion.

It is still another object of the invention to provide a suspension for the force transmission member which will not require servicing or adjustment.

It is a further object of the invention to provide a support for the force transmission member with a well defined pivot axis location with very low-level controlled torque forces for displacement and restoration.

It is still a further object of the invention to provide access to the insert molded metal member to permit attachment of another metal part to the insert molded member in a region otherwise surrounded by the plastic of the rocker body.

SUMMARY OF THE INVENTION

The shortcomings of the prior art are overcome and the objects of the invention accomplished by supporting a rocker member on a leaf spring torsion bearing having a high degree of stiffness in a vertical plane.

The location of the pivot axis for a force transmission member within the carriage of a tape drive is defined by the use of a leaf spring extending from the body of the force transmission member or rocker and supported by the carriage of the tape drive. The carriage is provided with mounting slots formed into its structural members to accommodate the leaf springs, thereby forming the pivot, and at the same time serving as a mounting datum having consistency relative to the carriage structure.

The leaf spring is formed as a portion of a sheet metal insert. The insert is thereafter insert-molded into a stiff plastic part which forms a body of the force transmission member or rocker. In addition to the torsion spring arms of the leaf spring, the insert also has beams that are substantially enclosed within the stiff plastic body of the force transmission member. The body of the force transmission member or rocker is formed so as to provide recesses disposed and formed to expose attachment slots in one beam of the insert, thereby permitting the bonding of connection tabs of a voice coil motor (VCM) support spring to the rocker at controlled locations. The recesses not only provide access to the beam within the body of the rocker but also act to hold and control the flow of bonding agents used to attach the connection tabs of the voice coil motor support spring to the beam of the insert within the force transmission member after molding and during assembly. The arms forming the torsion spring extend from the body of the rocker and may be formed to provide tabs bent substantially perpendicular to the arms. The tabs restrain movement of the rocker and the spring arms in the direction substantially co-axial to the axis of the arms.

Further, the torsion spring arms are narrowed at selected locations to reduce the width of the arms, thereby reducing the force per degree of rotation necessary to move the rocker. The notching or reduction of the width of the arms is accomplished while maintaining the stiffness in a vertical direction. The axis of rotation is well defined by the torsion axis of the spring arms; and due to the nature of the torsion arms, the axis of rotation remains fixed and consistent relative to the carriage of the tape drive actuator.

The insert, being insert-molded into the stiff plastic rocker, results in a composite having a very defined pivot axis with respect to the axis of the pivot arms. The insert-molding provides a consistent and reliable part without any need to attach the insert to the plastic body, a post-molding attachment operation. A more complete understanding of the invention and its advantage and operation may be had from the attached drawing and detailed description of the invention to follow.

BRIEF DESCRIPTION OF THE DRAWINGS

FIGS. 1, 2, and 3, correspond to FIGS. 1, 2, and 10, of the U.S. patent applications Ser. Nos. 08/489,462, 08/474,227, and 08/472,829 identified above and incorporated herein by reference. The reference numerals used in FIGS. 1, 2, and 3, having a reference numeral value of less than 300 correspond to the reference numerals in FIGS. 1, 2, and 10, of the above co-pending applications. All reference numerals of 300 or larger are not found in the above co-pending applications and are described herein relative to FIGS. 1, 2, 3, hereof.

DETAILED DESCRIPTION OF THE PREFERRED EMBODIMENT OF THE BEST MODE

AS CONTEMPLATED BY THE INVENTORS FOR CARRYING OUT THE INVENTION

Figure 1:
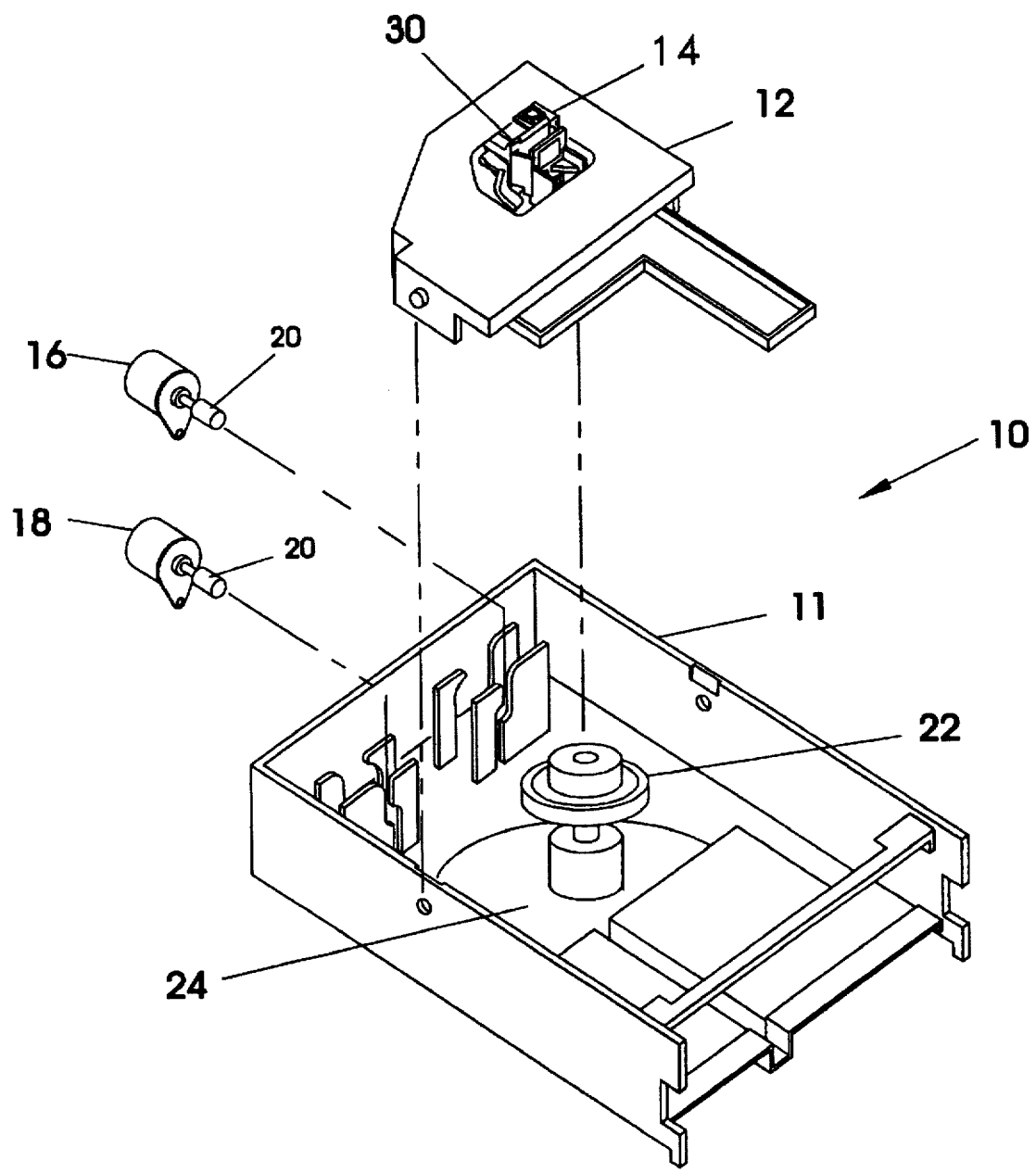
FIG. 1 illustrates a partially exploded view of a high density data storage tape drive system.

Referring initially to FIG. 1, there is illustrated a partial tape drive 10 of the type in which the invention may be used.

Figure 2:
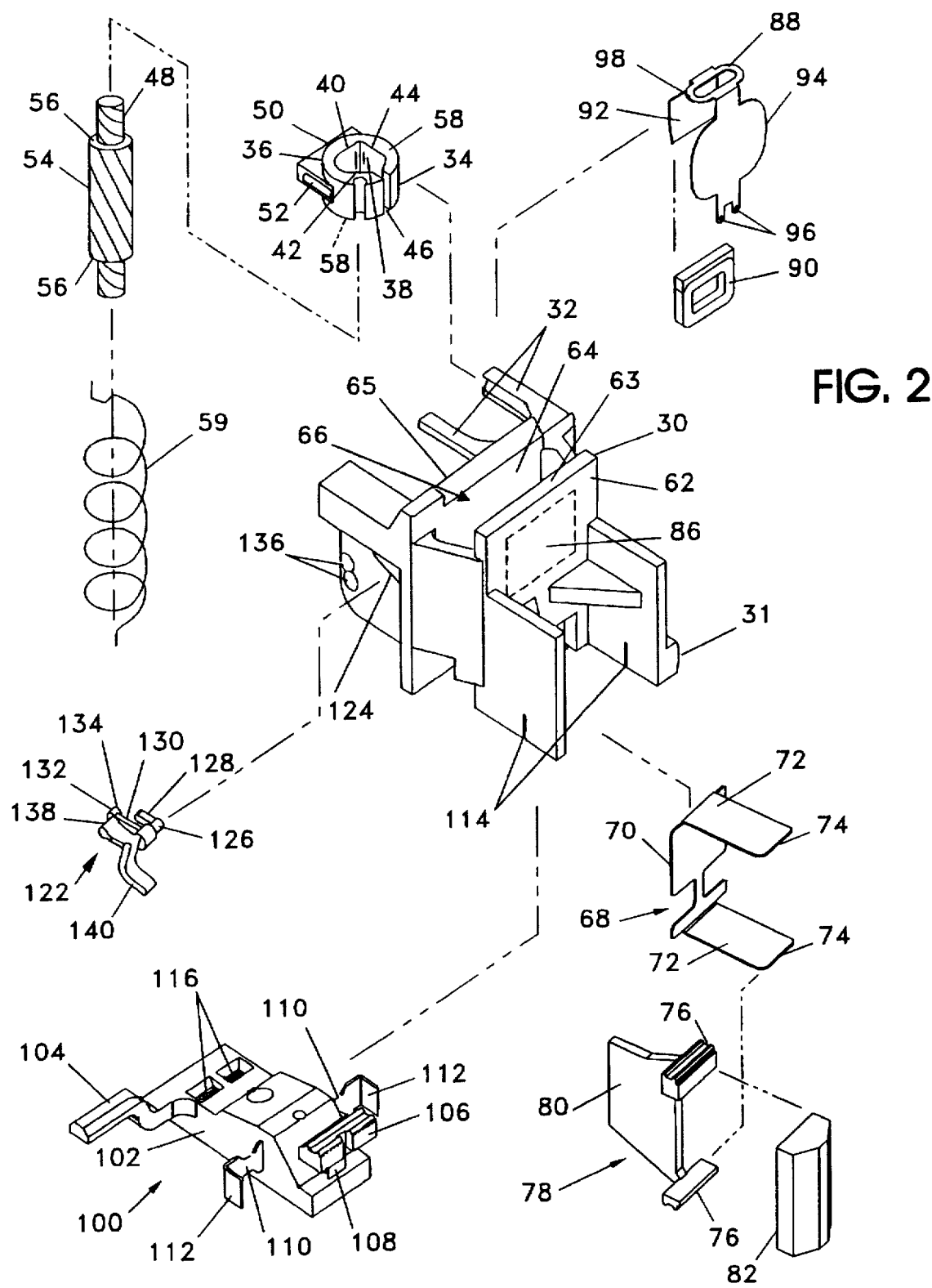
FIG. 2 is an exploded view of the actuator of the tape drive illustrated in FIG. 1.

FIG. 1 illustrates tape drive 10 with the cover removed for visibility and with bridge 12 exploded out of and removed from the tape drive chassis 1 1. The bridge 12 supports the magnetic read/write head positioning assembly 14. Read/write head positioning assembly 14 is illustrated in FIG. 2 in an exploded view and will be addressed in more detail with reference to that figure.

Stepper motors 16 and 18 are supported by chassis 11 of the tape drive 10. Read/write head positioning stepper motor 16 through worm gear 20 provides the drive motion to move the read/write head positioning assembly 14 relative to bridge 12. Tape drive 10 is further provided with the capstan drive 22 necessary to feed the tape, not shown. Capstan drive 22 comprises a soft rubber wheel or roller to engage the tape of a cartridge, not shown, for feeding purposes and is driven by capstan drive motor 24.

Voice Coil Motor (VCM) spring 88 is provided having a mounting pad or attachment pad 92 which permits the adhesive attachment of VCM spring 88 to the back surface 63 of vertical wall 64 with the voice coil 90 disposed within cavity 66. VCM spring 88 also has an oval span 98 intermediate the attachment pad 92 and the coil mount pad 94. The oval span 98 provides flexibility and the ability to move the coil mount pad 94 vertically within limits with the respect to attachment pad 92. While the stepper motor 16 drives the carriage 30 to provide coarse positioning, the movement of the voice coil 90 provides the fine positioning.

Extending from the bottom portion of coil mount pad 94 are connection tabs 96 which serve to accept a connecting material such as an epoxy to connect the coil mount pad 94 to the rocker 100 for bi-directional movement therewith.

Rocker 100 is formed as a beam member 102 having a latch arm 104 extending from one side thereof. On the opposite end of beam member 102 from latch arm 104 is a push bar 106 attached by a web 108. Flexures or torsion spring arms 110 protrude from the sides of beam 102. Flexures or torsion spring arms 110 made of a thin leaf spring material have been formed with tabs 112 to assist in positioning flexures 110 within slots 114 of carriage 30. Resident within slots 114, flexures 110 provide adequate bending capability and capacity to permit the rocker 100 to oscillate over a limited oscillation range. Rocker 100 is further provided with recesses 116 into which connection tabs 96 are inserted and permanently attached by an epoxy or comparable adhesive material. The flexures or torsion spring arms 110 are very stiff in a vertical plane yet still have a relatively low torsional stiffness. The torsion spring arm 110 may be tailored further in its torsional spring resistance by the notching or scalloping 320 of the top and bottom edges 310, 312 to form a reduced cross section 314 in the arm 110. The extent of the notching or scalloping can be optimized to maximize vertical stiffness, minimize torsional stiffness and minimize flexural stress of the torsional spring arms 110.

Recesses 116 form pockets which are chamfered on the sides to provide lead-in surfaces for the tabs 96 of the VCM mount pad 94. Also, the pockets or recesses 116 serve to contain and confine the bonding agent used to attach the tabs 96 to the insert 226 from which torsion arms 110 extend.

Push bar 106 is engageable with and attached to beam spring end 74 of cantilever beam spring 72 which resides on the bottom of the spring 68. Push bar 106 is adhered with epoxy or comparable material to connect push bar 106 to the web 108 and magnetic head 82 assembly. Flexible web 108, an extension of insert 226 of FIG. 3, interconnects the end of beam 102 and push bar 106 and provides mobility to push bar 106 with respect to the end of beam 102, thereby accommodating any slight misalignment which might occur whenever rocker 100 pivots about flexure 110 and does not perfectly follow the translation of magnetic head 82. Web 108 further minimizes any forces caused by the rocker beam 102 which may tend to urge the magnetic head 82 away from the magnetic tape surface, thereby preventing degradation of the recording or reading of the data on the tape. Push bar 106 is preferably insert-molded around web 108.

Figure 3:
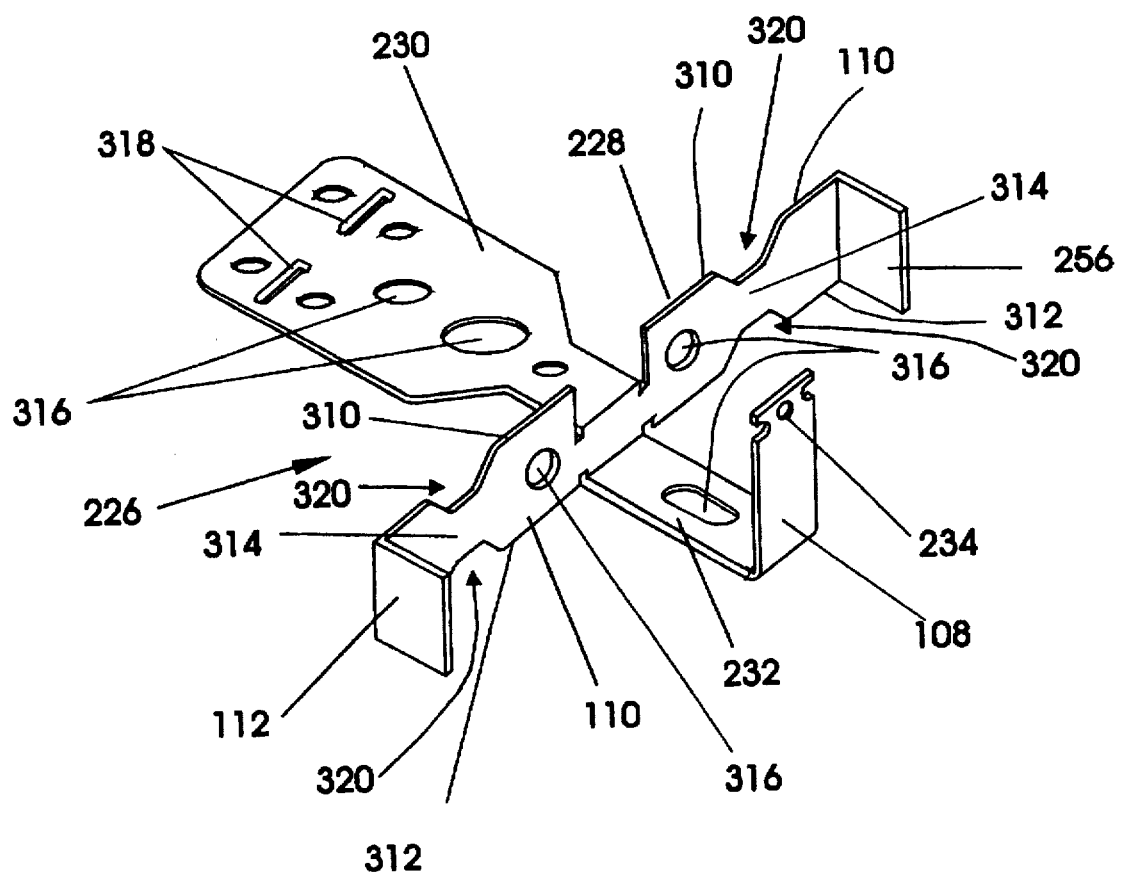
FIG. 3 is an illustration of the insert of the rocker shown in FIG. 2.

Referring now to FIG. 3, an insert or pivot leaf spring 226 is illustrated. Pivot leaf spring 226 is comprised of a plurality of segments, particularly flexures 110 and flexure tabs 112. Extending from beam 228 interconnecting flexures 110 are beams 230 and 232. Beam 230 provides significant area in which the plastic of the rocker 100 as shown in FIG. 2 may be incorporated. This leaf spring 226 and particularly beams 230, 232 and the portion of beam 228 between flexures 110 may be insert-molded into the plastic. The push bar 106 of rocker 100 then may be insert-molded around the end of tab 234 with tab 234 providing the web 108 described earlier with respect to FIG. 2.

The formation of the flexure leaf spring 226 and its incorporation into rocker 100 by insert-molding enhances the precise control and the resilient return movement of rocker 100 and the movement of VCM coil 90 and magnetic head 82 in FIG. 2. Insert-molding leaf spring or insert 226 into stiff plastic securely fixes the plastic rocker body 100 of beam member 102 to the insert 226 with permanence and rigidity. Holes 316 serve to accept plastic to anchor the plastic body 100 to insert 226. Connecting holes 318 accept tabs 96 for attachment by bonding such as with epoxy.

It will be recognized by one skilled in the art that minor variations and modifications to the invention may be made without removing the apparatus from the scope of the appended claims which define the application.

We claim:

1. A high density data storage tape drive for use with a cartridge containing a length of storage tape, comprising:
   a frame;
   a drive mechanism supported on said time to spool said tape;
   a read/write head disposed adjacent said tape;
   an electrical drive having a fixed portion and a movable portion;
   said head supported on And movable with respect to a carriage, said carriage displaceable relative to said tape in coarse increments;

a pivotable force transmission member engaged with said head and said movable portion of said electrical drive for transmitting movement of said movable portion of said electrical drive to said head, thereby displacing said head relative to said carriage and the tape in fine increments;

said force transmission member including a leaf spring secured to said carriage and having a scalloped edge defining a pivot bearing said scalloped edge provided in a plane parallel to a plane of a recording surface of the storage tape, said scalloped edge of said leaf spring providing reduced stress per degree of rotation at said pivot bearing with an axis parallel to said plane of the storage tape.

2. The high density data storage tape drive of claim 1 wherein said leaf spring is connected to said head for controlling movement thereof responsive to movement of said movable portion of said electrical drive.

3. The high density data storage tape drive of claim 2 wherein said electrical drive comprises a voice coil motor.

4. The high density data storage tape drive of claim 3 wherein said force transmission member further comprises a projecting portion spanning between one end of said force transmission member and said head and disposed in the direction of movement of said head, said projecting portion deflectable to accommodate misalignment of said head and said force transmission member during various phases of movement of said leaf spring and said head.

5. A high density data storage tape drive for use with a cartridge containing a length of storage tape, comprising:

a frame;

a drive mechanism supported on said flame to spool said tape;

a read/write head disposed adjacent said tape;

said head supported on and moveable with respect to a carriage, said carriage displaceable relative to the tape in coarse increments;

a pivotable force transmission member engaged with said head and a movable portion of a voice coil motor for transmitting movement of said movable portion of said voice coil motor to said head, thereby displacing said head relative to said carriage and the tape in fine increments;

said force transmission member including a metal leaf spring secured to said carriage and insert-molded into a rocker engaged with said head and said movable portion of said voice coil motor, wherein said metal leaf spring allows pivotable movement of said head relative to said rocker about an axis substantially parallel to a plane of a recording surface of the storage tape while providing a high degree of stiffness in the plane substantially parallel to the recording surface of the storage tape.

6. A high density data storage tape drive of claim 5 wherein said metal leaf spring in its engagement with said carriage is disposed to provide a high degree of stiffness in a plane substantially parallel to a plane of movement of said movable portion of said voice coil motor and a low resistance to torsion within said leaf spring.

7. The high density data storage tape drive of claim 5 wherein said metal leaf spring in its engagement with said carriage is disposed with ends of said leaf spring confined in slots formed into said carriage.

8. The high density data storage tape drive of claim 6 wherein said force transmission member further comprises a projecting portion spanning between one end of said force transmission member and said head and disposed in the direction of movement of said head, said projecting portion deflectable to accommodate misalignment of said head and said force transmission member during various phases of movement of said leaf spring and said head.

9. A high density data storage tape drive for use with a cartridge containing a length of storage tape, comprising:

a frame;

a drive mechanism supported on said frame to spool said tape;

a read/write head disposed adjacent said tape;

said head supported on and movable with respect to a carriage, said carriage displaceable relative to the tape in coarse increments;

a pivotable force transmission member engaged with said head and a movable portion of a voice coil motor for transmitting movement of said movable portion of said voice coil motor to said head, thereby displacing said head relative to said carriage and the tape in fine increments;

said force transmission member including a metal leaf spring secured to said carriage and insert-molded into a rocker engaged with said head and said movable portion of said voice coil motor, said rocker including a pocket exposing a portion of said metal leaf spring, said movable portion of said voice coil motor including a metal mating member bonded to exposed portions of said metal leaf spring wherein said metal leaf spring allows pivotable movement of said head relative to said rocker about an axis substantially parallel to a plane of a recording surface of the storage tape while providing a high degree of stiffness in the plane substantially parallel to the recording surface of the storage tape.

* * * * *